United States Patent [19]

Harrell

[11] Patent Number: 5,768,822
[45] Date of Patent: Jun. 23, 1998

[54] COMBINATION INSECT/WEED DESTROYER

[76] Inventor: Robert C. Harrell, 616 N. St. John Ave., Dyersburg, Tenn. 38024

[21] Appl. No.: 562,884

[22] Filed: Nov. 27, 1995

[51] Int. Cl.⁶ .......................... A01M 5/00; A01M 21/04
[52] U.S. Cl. ................................ 43/144; 47/1.44
[58] Field of Search ................ 43/144, 142, 143, 43/1.44; 126/271.1

[56] References Cited

U.S. PATENT DOCUMENTS

| | | | |
|---|---|---|---|
| 419,559 | 1/1890 | Rice | 47/1.44 |
| 1,436,958 | 11/1922 | Herbert | 43/144 |
| 2,569,194 | 9/1951 | Pool et al. | 47/1.44 |
| 2,587,873 | 3/1952 | McNeill | 47/1.44 |
| 3,805,766 | 4/1974 | Hammon | 47/1.44 |
| 4,094,088 | 6/1978 | Harrell | 43/144 |
| 4,148,150 | 4/1979 | Harrell | 43/144 |

*Primary Examiner*—Jeanne Elpel
*Attorney, Agent, or Firm*—Reid & Priest L.L.P.

[57] ABSTRACT

A tractor mountable apparatus for collecting and destroying insects from multiple rows of plants, and for simultaneously burning unwanted vegetation on the ground between the rows of plants as the tractor passes along the rows, is disclosed. The apparatus includes a supporting frame mountable upon the front end of a tractor with a number of open top metal pans suspended from the supporting frame at spaced intervals such that the pans pass between rows of plants as the apparatus moves through a field. Each of the pans has three or more transversely spaced elongated gas burner conduits for directing combustible gases along the surface of the pan and directing the combustible gases downwardly beyond the rear end of the pan for destroying insects that are knocked into the pan as the pan passes between the rows, and for destroying unwanted vegetation between the rows of plants.

6 Claims, 3 Drawing Sheets

COMBINATION INSECT/WEED DESTROYER

BACKGROUND OF THE INVENTION

1. Field of the Invention

This invention relates to a mobile apparatus preferably carried on the frame of a tractor for movement through a field of row crops, such as cotton, to agitate the plants in the rows being traversed and to knock insects therefrom so that the insects fall into a plurality of open topped pans moving between the rows, whereby the insects are completely incinerated and destroyed by the heat and flames from a plurality of burners located in each of the open topped pans, and furthermore to destroy insects and unwanted vegetation on the ground between the rows of crops.

2. Related Art

Tractor mountable apparatus for collecting and destroying insects by agitating the plants so that the insects drop into pans carried by the apparatus beneath the agitating means, and for destroying the insects by burning them in the open topped pans, are known in the art. Examples of such apparatus are shown in U.S. Pat. No. 4,094,088 to Harrell and U.S. Pat. No. 4,148,150 to Harrell.

SUMMARY OF THE INVENTION

This invention provides an improved means for removing and destroying insects from multiple rows of row crops in a single pass through a field, while simultaneously allowing for the destruction of insects and unwanted vegetation on the ground between the row crops. It is an object of this invention to provide insect removing and destroying apparatus in combination with unwanted vegetation destroying means, which includes a supporting frame that is readily attachable to and detachable from the front end of a tractor; a plurality of transversely spaced, elongated metal pans suspended beneath the frame; flexible agitator means for each pan for agitating the sides of plants in the rows passed by the pans and for knocking bugs therefrom; a plurality of transversely spaced longitudinal gas burners in each pan for heating the pans and destroying insects falling therein; burner extensions that extend beyond an end of each pan; and protective burner covers formed from metal panels that are rounded to an elongated dome shape and mounted above and along the length of each of the transversely spaced burners for providing additional heated surfaces as well as preventing the burners from clogging with debris.

In one embodiment of this invention, fluid couplings located at the end of each of the transversely spaced longitudinal burners, which provide connections to gas supply lines, are located at the front of each pan and are protected by covers extending across the front of each pan.

Optional burner extensions, extending beyond the rear of each of the pans can be provided for directing the heat and flames from the burners in order to destroy unwanted vegetation and insects located on the ground in between the rows of crops. Additionally, vertically oriented metal heat deflectors can be provided extending from and pivotally connected to the sides of the pans at their rear ends and angling towards the respective rows between which the pans are passing in order to deflect the heat and flames and prevent damage to the stalks of the row plants. These heat deflectors can be constructed from a double layer of metal having a dead air space in between two parallel pieces of metal to provide improved heat insulation.

A multiple link arm can be connected to the front of each pan at a point behind the protective cover extending across the front of each pan and being pivotally connected to the bottom of each pan for allowing the pans to be raised and lowered in order to avoid obstacles on the ground in between the row crops.

A T-type connector and a plurality of metal conduits provide a connection between a gas supply line and each of the transversely spaced longitudinal gas burners.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
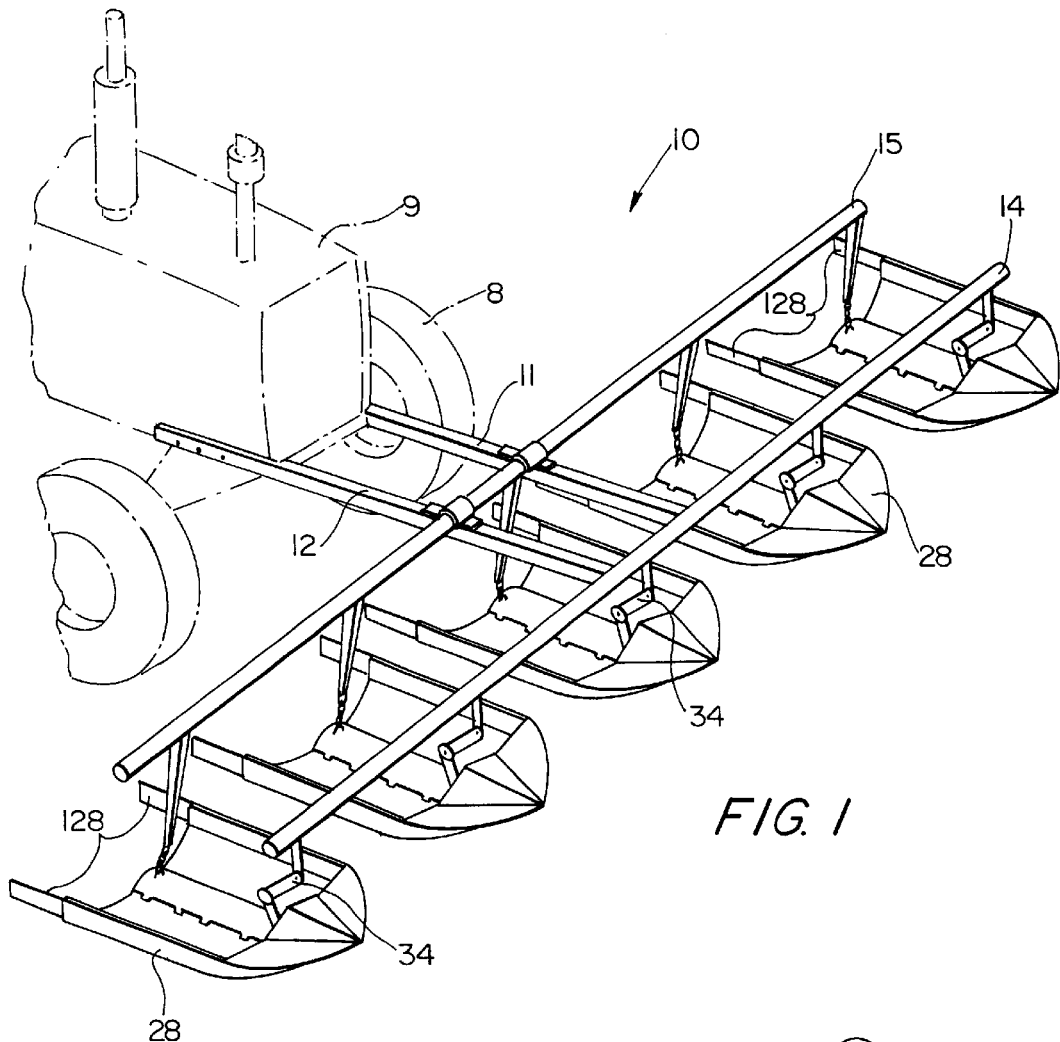
FIG. 1 is a perspective view showing one embodiment of the invention mounted on the front end of a row crop tractor, which is shown in phantom.
Figure 2:
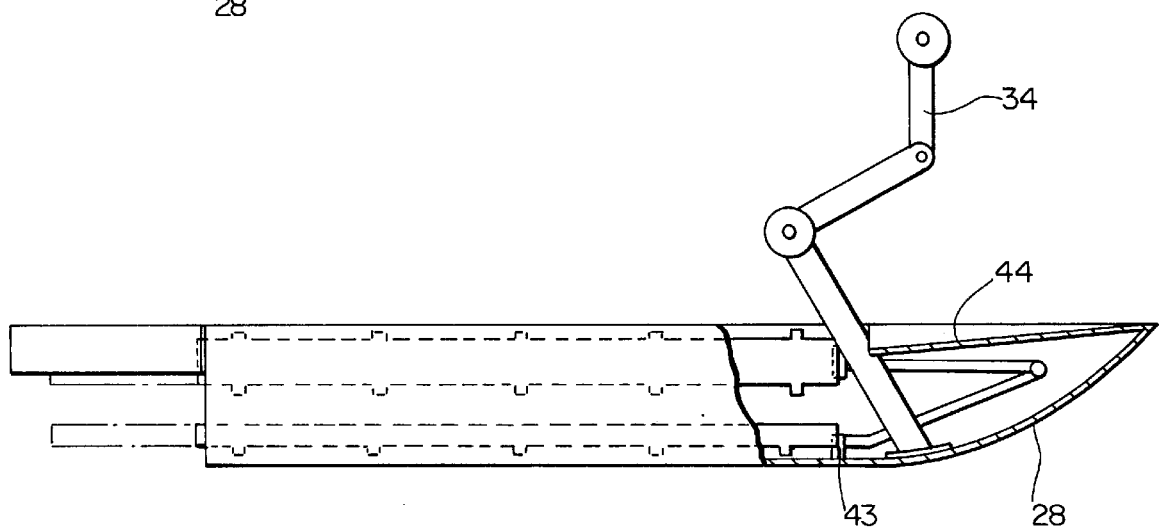
FIG. 2 is a side elevation view of one of the pans of the present invention, illustrated partially in cross-section in order to show the connection between the multiple link arm and the base of the pan.
Figure 3:
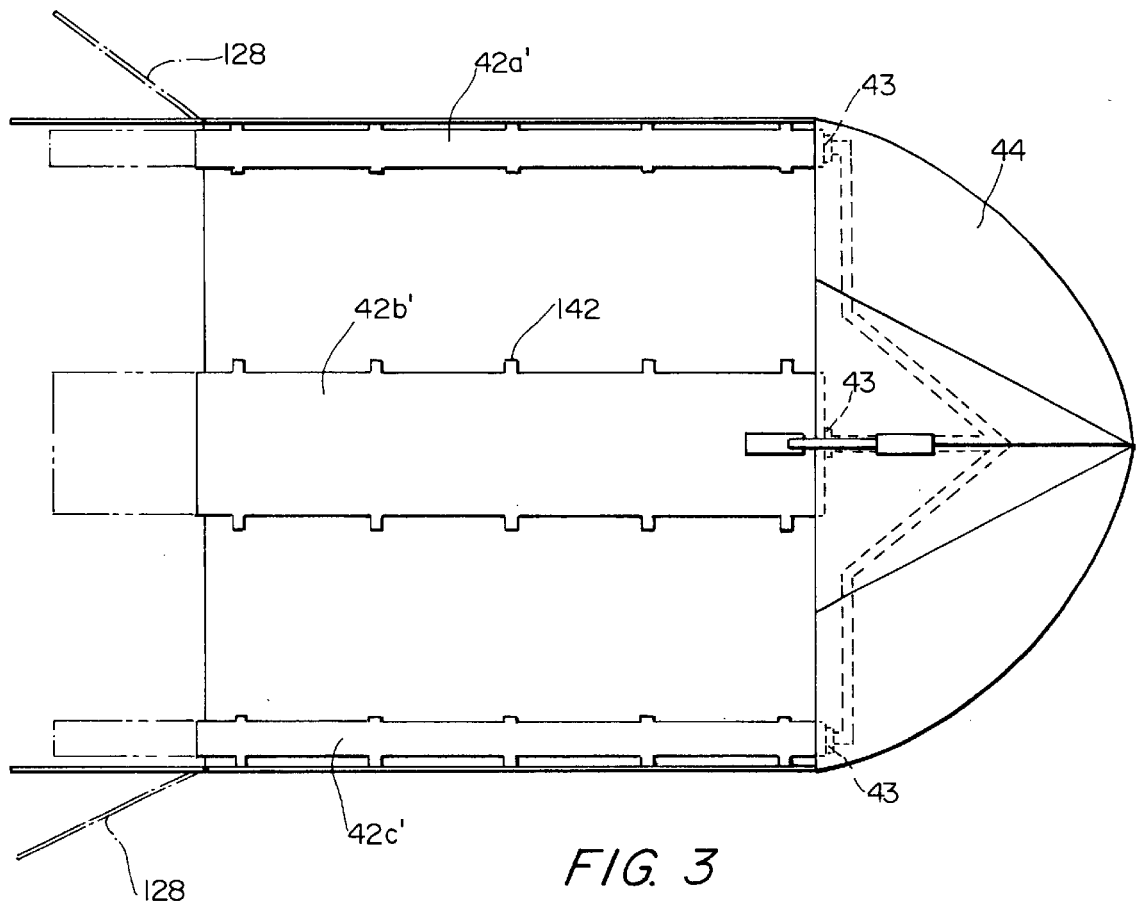
FIG. 3 is a top plan view of one of the pans of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to the drawings and particularly to FIG. 1, one embodiment of the insect and weed destroying mechanism of this invention, generally indicated by the numeral 10, is illustrated as being detachably mounted forward of the front wheels 8 of a row crop tractor 9. Details of the mounting of the apparatus of the present invention not shown in the drawings are clearly detailed in U.S. Pat. Nos. 4,094,088 and 4,148,150, both to Harrell, which are herein incorporated by reference.

The apparatus 10 includes a frame having a pair of parallel, transversely spaced longitudinal support members 11 and 12, and a pair of longitudinally spaced parallel transverse support members 14 and 15. The longitudinal support members 11 and 12 are preferably heavy gauge angle iron bars which extend rearwardly along opposite sides of the front end of the tractor and are bolted to the tractor by bolts. Major portions of the longitudinal support members 11 and 12 project forwardly of the tractor's front wheels 8 and have mounted thereon the parallel transverse support members 14 and 15, which are, for example, elongated pipes. The front transverse support member 14 is clamped on the top of the longitudinal support members 11 and 12 by U-bolt clamps or similar means.

Suspended beneath the transverse support members 14 and 15 are a plurality of elongated insect destroying boat shaped pans 28. The pans 28 are approximately equally spaced along the transverse support bars 14 and 15. Sufficient space is provided between adjacent pans 28 to permit the passage of rows of cotton or other crops between the pans as the tractor with the insect and weed destroying apparatus of this invention attached, moves along the rows. The front end of each of the pans is pivotally supported from the front transverse support member 14 by a multiple link arm 34. Each arm 34 is fixedly connected at a lower end to the front end of a pan 28, and is pivotally connected at an upper end of arm 34 to transverse member 14, with arms 34 allowing for the raising and lowering of each pan 28.

Figure 4:
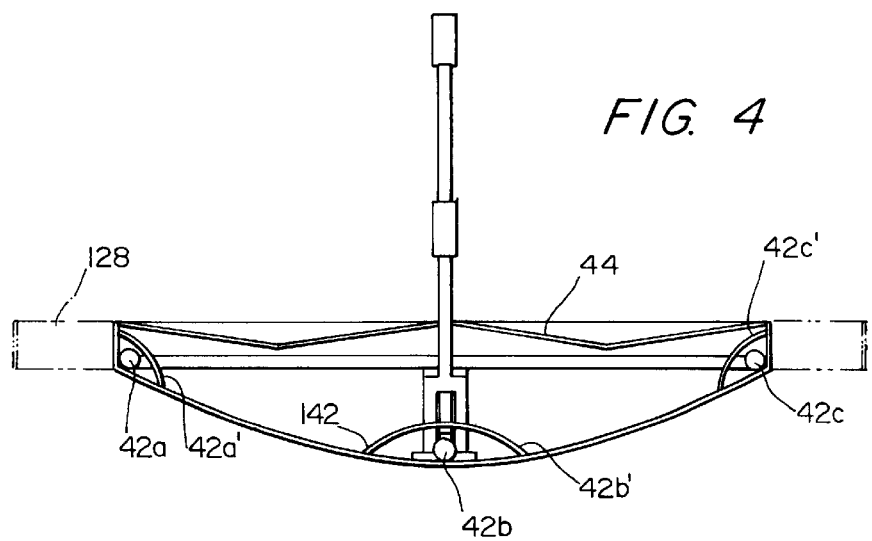
FIG. 4 is an end elevation view of one of the pans of the present invention.

Pans 28 are substantially identical to each other in structure and are each provided with transversely spaced longitudinal gas burner pipes 42a, 42b, and 42c (shown in FIG. 4) that run the length of each pan and that are connected at their forward ends to a gas supply line by lengths of pipe and standard fluid couplings 43. The lengths of pipe and gas couplings 43 connecting each burner to a gas supply line are located at the front end of each pan 28 and are protected by a metal cover plate 44 that extends across the front end of each pan 28. Cover plate 44 prevents debris from collecting on gas couplings 43 and from possibly clogging the gas burner pipes.

The side edges of each pan 28 can be provided with flanges 29 extending outwardly from the side edges of pans 28 to protect the plants from abrasive damage as well as heat damage that may result from transfer of heat through pans 28. The leading edge 29a of flanges 29 is rounded in order to reduce damage upon contact with the plants. To improve the heat insulating qualities of the flanges 29, a hollow tube of metal 30 can be provided at the outboard edge of each flange 29 with the center of each tube 30 forming a dead air space for preventing transfer of heat through flanges 29 to adjacent plants.

Each burner is provided with a protective rounded metal burner cover mounted above and running the length of each of the burners for creating additional heated surfaces as well as keeping the burners free from being clogged with debris. Burner cover 42a' covering burner 42a, 42b' covering burner 42b, and 42c' covering burner 42c can extend beyond the rear end of each pan 28 in order to provide a means for directing the gas from each of the burners in a downward direction in order to destroy insects and vegetation located on the ground in between the row crops. Spaced tabs 142 extending laterally from the sides of the burner covers provide a means for attaching each of the burner covers, such as by spot welding, to pans 28. Tabs 142 also provide clearance between the burner covers and pan 28 to allow the heat and flames from each of the burners to project across the entire bottom of each pan 28.

Figure 5:
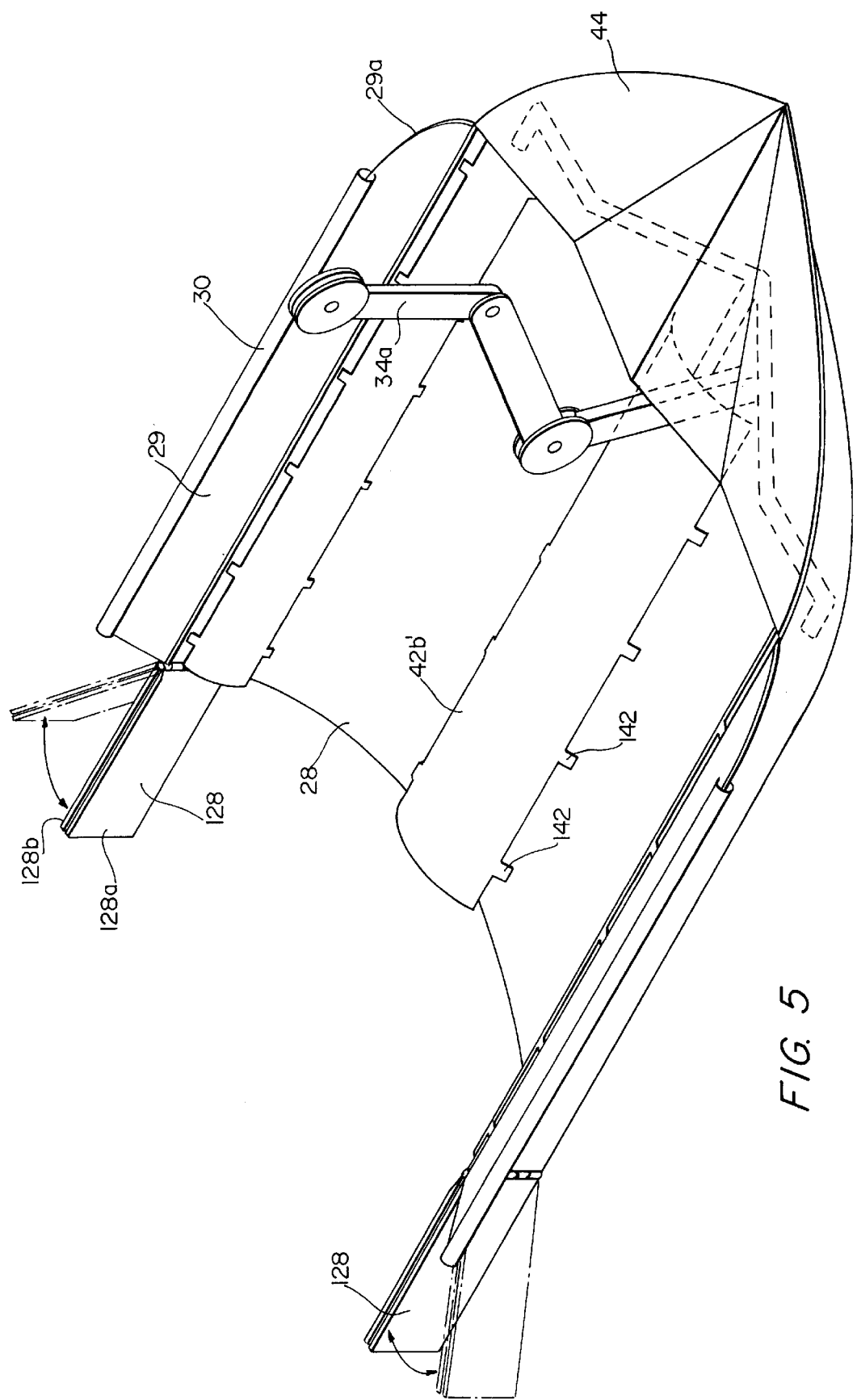
FIG. 5 is a top perspective view of one of the pans of the present invention.

Vertically oriented metal heat deflectors 128, shown in FIG. 5 are pivotally connected to the rear edges of both sides of pans 28, extending rearwardly from each pan 28 and being angled toward the rows of crops on both sides of each pan 28 such that the heat and flames from the gas burners are deflected away from the row crops.

Metal deflectors 128 are preferably constructed from two parallel, spaced metal plates 128a and 128b that are welded together around the periphery of the plates with a dead air space trapped in between the plates for improved heat insulating qualities.

In an alternative embodiment according to the present invention, gas burner tubes 42a, 42b, and 42c can be eliminated, thus simplifying the apparatus and reducing the total number of parts required, with burner covers 42a', 42b', and 42c' acting as gas conduits to guide gas expelled from gas couplings 43 at the front end of each pan 28, along each pan 28 and then downwardly towards the ground in between the row crops.

A manifold, such as manifold 75 shown in U.S. Pat. No. 4,094,088, is provided for each pan 28 and provides gas to the individual gas burners 42a, 42b, and 42c through gas couplings 43. In use, a main gas valve is turned on and a regulator valve is adjusted to the desired gas pressure for distribution to the gas burners 42a, 42b, and 42c. Once the burners are ignited, or the jets of gas funneling underneath burner covers 42a', 42b', and 42c' are ignited, the apparatus 10 is ready for travel and the tractor begins its movement through a field of row crops. The pans 28 are lowered by operating hydraulic controls, such as described in U.S. Pat. No. 4,094,088, so that pans 28 slide on top of the ground or just above the ground between the rows of crops.

Modifications and variations of the above-described embodiments of the present invention are possible, as appreciated by those skilled in the art in light of the above teachings.

It is therefore to be understood that, within the scope of the appended claims and their equivalents, the invention may be practiced otherwise than as specifically described.

What is claimed is:

1. Tractor mountable apparatus for collecting and destroying insects from multiple rows of growing plants and for destroying unwanted vegetation between the rows of growing plants, said apparatus comprising:

a supporting frame including transversely spaced longitudinal support members for mounting to the front end of a tractor to project forward therefrom, and longitudinally spaced transverse support members carried by said longitudinal support members;

a plurality of open top elongated metal pans;

suspension means connected to said transverse support members and to said metal pans for suspending said metal pans at spaced intervals so that said metal pans move adjacent the ground between the rows of plants as the tractor mountable apparatus moves along the rows of plants;

each of said metal pans having a plurality of transversely spaced longitudinal gas burner conduits for directing combustible gases along said pans for burning insects that fall into said pans as said pans move between the rows of plants;

fluid couplings connecting said gas burner conduits to gas supply lines at one end of each of said metal pans; and a protective cover extending across said one end of each of said metal pans for preventing debris from entering each of said metal pans at said one end.

2. The apparatus of claim 1 wherein:

said gas burner conduits extend beyond an end of each of said pans for directing said combustible gases downwardly towards the ground between the rows of plants for burning unwanted vegetation and insects on the ground between the rows of plants.

3. The apparatus of claim 1 wherein:

said gas burner conduits comprise elongated metal tubes having a plurality of orifices spaced therealong.

4. The apparatus of claim 3 wherein said apparatus further comprises a burner cover for each of said gas burner conduits, wherein said burner covers are made from metal panels that are formed to an elongated dome shape and are mounted over said elongated metal tubes for protecting said metal tubes from debris and for providing additional heated surfaces for burning insects.

5. The apparatus of claim 1, wherein:

said gas burner conduits extend beyond an end of each of said pans for directing said combustible gases downwardly towards the ground between the rows of plants for burning unwanted vegetation and insects on the ground between the rows of plants;

said gas burner conduits comprise elongated metal tubes having a plurality of orifices spaced therealong.

6. The apparatus of claim 1, wherein:

said gas burner conduits extend beyond an end of each of said pans for directing said combustible gases downwardly towards the ground between the rows of plants for burning unwanted vegetation and insects on the ground between the rows of plants;

said gas burner conduits comprise elongated metal tubes having a plurality of orifices spaced therealong; and wherein said apparatus further comprises a burner cover for each of said gas burner conduits, wherein said burner covers are made from metal panels that are formed to an elongated dome shape and are mounted over said elongated metal tubes for protecting said metal tubes from debris and for providing additional heated surfaces for burning insects.

* * * * *